(No Model.)
G. G. WICKSON.
WHIFFLETREE AND TRACE HOLDER.
No. 301,652. Patented July 8, 1884.
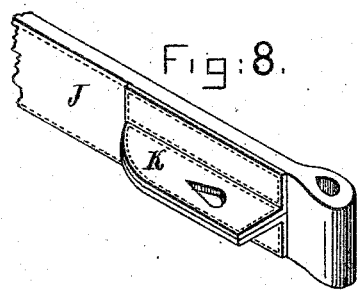
Fig: 8.
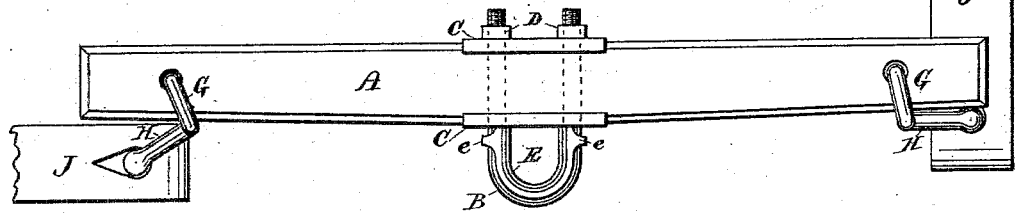
Fig: 1.
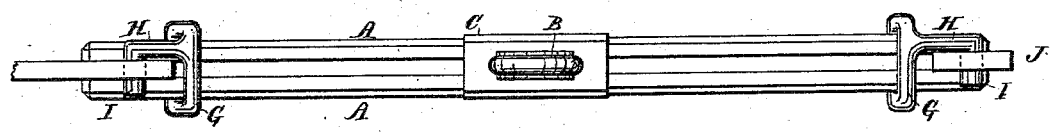
Fig: 2.
Fig: 3.  Fig: 4.  Fig: 5.
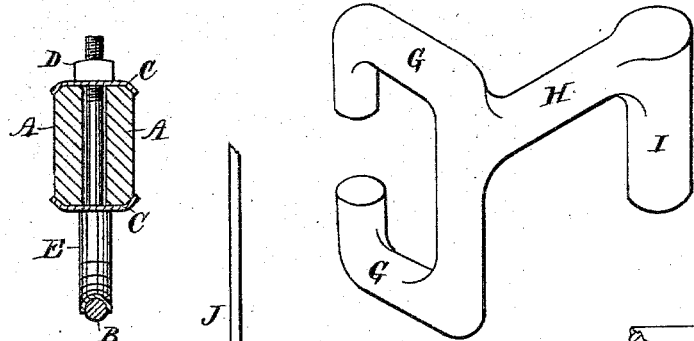
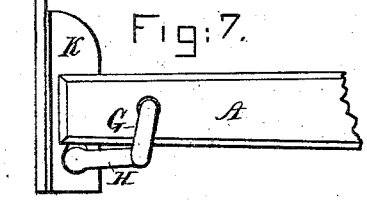
Fig: 7.
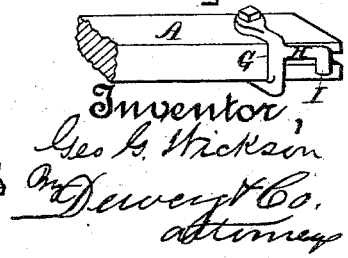
Fig: 6.
Witnesses,
Geo. H. Strong.
J. H. Nourse
Inventor,
Geo. G. Wickson
By Dewey & Co.
Attorneys

UNITED STATES PATENT OFFICE.

GEORGE G. WICKSON, OF SAN FRANCISCO, CALIFORNIA.

WHIFFLETREE AND TRACE-HOLDER.

SPECIFICATION forming part of Letters Patent No. 301,652, dated July 8, 1884.

Application filed December 28, 1883. (No model.)

*To all whom it may concern:*

Be it known that I, GEORGE G. WICKSON, of the city and county of San Francisco and State of California, have invented an Improvement in Whiffletrees and Trace-Holders; and I hereby declare the following to be a full, clear, and exact description thereof.

My invention relates to an improved draft-bar or whiffletree and trace-holder; and it consists of two parallel wooden bars firmly secured at a certain distance apart, and at the same time held in that position by a draft-link, clamping-plates, and nuts. The ends are held in place by peculiarly-shaped swivel-hooks, which also serve for the attachment of the traces and to hold them in such a position as to protect trees or vines from injury as they pass.

My invention also relates to a means for protecting the draft link or staple from wear and to act as a shoulder or stop when the nuts are turned up tight, without the necessity for forming shoulders upon the staple, all of which will be more fully explained by reference to the accompanying drawings, in which—

Figure 1 is a plan or top view of my device. Fig. 2 is a rear edge view. Fig. 3 is a transverse vertical section taken through the bars in line with one leg of the staple. Fig. 4 is an enlarged perspective view of the end hook and trace-holder link. Fig. 5 is a view of the lining-arc for the staple. Fig. 6 shows the end of a solid bar arranged for the trace-link. Fig. 7 is a plan view showing edge of trace with strip K. Fig. 8 is a perspective view of the same.

In order to make my whiffletree as strong and light as possible, I employ two flat strips, A A, about one-third as thick as the whole depth or thickness of the complete bar, and having the desired width and length.

The draft link or staple B passes between the parts A A at the center and also through two metal plates, C, one upon each side of the bar, which have holes punched in them to allow the two legs of the staple to pass through. These plates are slightly wider than the thickness of the complete bar when the staple is in place between the parts A A, and their edges are bent so as to clasp the edges of the wooden strips or opposite sides. When the nuts D are turned up on the screw-threaded ends of the legs of the staple, they cause these plates to clamp the bar and hold the parts solidly together. In some cases it may be found preferable or advisable to pass a bolt vertically through the center of the strips A and between the legs of the staple, to hold them more securely. The legs of the staple may have shoulders which abut against the rear plate, C, and thus offer the necessary resistance to the nuts when they are screwed up; but I prefer to employ an arc, E, shaped like the curve of the staple, and having its outer periphery grooved or channeled so that it will fit partially around the staple, and it may also have lugs or clips $e$, which can be bent around the legs of the staple, so as to hold the arc E firmly in its place. This arc is of such a length that its ends form the shoulders to rest against the plate C, when the nuts are turned up against the opposite side. This construction allows me to make my staples of plain round iron without shoulders, and reduces the expense. The arc is also important, both in this or any other form of draft-bar in which a staple is used, as a protection against wear. The staple is usually worn very thin at the center by the constant action of the connecting draft-link, and when this occurs must be taken out and replaced by a new one. By the use of these supplemental arcs within the curve of the staple they receive all the wear, and when they are cut through they may be easily removed and others inserted. The link or staple is thus always preserved in perfect condition, and the expense of new ones avoided.

In order to attach the traces and also to hold the ends of the two bars A in their proper relative position, I employ a link, G, made of round iron bent into the form of a square; or, if preferred, it may be a regular curve, the ends being separated, as shown. These ends enter holes made through the bars A A near the ends, and the link may be turned around upon them as upon a pivot. From one side of this link an arm, H, projects, forming an angle with the link greater than a right angle, as shown in Fig. 1, and it is turned down at the end, as at I. By making the angle between G and H greater than a right angle the link need not be turned so far back to attach the trace. The part H projects from the link G, preferably about opposite to the upper bar A, and the turned-down portion I thus stands across the opening between the two bars.

The trace J has a hole made near the end, and this is slipped over the pin I, the link having first been turned back far enough for the purpose. The edge of the trace is thus drawn into the slot or space between the two bars A A, and as the pin I is drawn close against the rear side of the two-part bar it locks the trace firmly in place. The outer edge of the trace will then serve as a protection for the bark of trees or shrubs, between which a harrow or cultivator may be drawn by means of this draft-bar or whiffletree. It will be manifest that a similar link may be used with a solid bar having a horizontal slot made in the end to receive the edge of the trace, as shown in Fig. 6. In this case the ends of the link above and below the bar are perforated, and a bolt passes through them and the bar, instead of the ends of the link being bent to enter the wood, as before described.

By this construction I produce a cheap, strong, and durable draft-bar, which is easily made or repaired, and with an easy means for attaching the draft-traces, so as to protect the trees from injury by the ends of the whiffletree.

If it is desired to have the trace stand edgewise instead of being turned flatwise, as shown in Fig. 1, I secure a thick strip, K, of trace-leather or other material, to the end of the trace at or about the center of its width, so as to project at right angles from it like a ⊢, as shown in Figs. 7 and 8. The hole to fit over the pin I will thus be made in this supplemental piece, and the trace will present its flat surface to the side and to touch anything which it may be passing.

Having thus described my invention, what I claim as new, and desire to secure by Letters Patent, is—

1. A draft-bar or whiffletree consisting of two parallel wooden strips, having a link or staple passing between them at the center, and through metallic plates, which clasp the edges of the bars at opposite sides, substantially as herein described.

2. A draft-bar or whiffletree consisting of two parallel wooden strips with metallic plates curved so as to clasp the opposite edges of the strips near the center, and perforated with holes opposite the space between the bars, in combination with a staple, the legs of which pass through the plates and the space between the bars, and nuts by which they are drawn together, substantially as herein described.

3. A draft-bar or whiffletree having a draft-link or staple near the center, in combination with an interior-curved arc, E, substantially as herein described.

4. The draft-link or staple of a whiffletree, in combination with a supplemental arc fitting the interior of said staple, and secured thereto by clips or other equivalent means, substantially as herein described.

5. In a draft-bar or whiffletree, the bar or bars A, in combination with the bent link G, with the arm H, and pin I, substantially as herein described.

6. A draft-bar or whiffletree having a horizontal space at the ends, curved links with the ends pivoted in the top and bottom of the bar, and having horizontal projecting arm H, and pin I, in combination with traces J with holes through which the pins pass, while the traces fit into the horizontal slots in the bar ends, substantially as herein described.

7. The means for protecting trees from injury by the ends of the draft-bars or whiffletrees of cultivators, consisting of a draft-bar having the ends slotted horizontally, draft-traces fitting the slots with their edges projecting beyond the ends of the bar, and pins attached to the bar and passing through holes in the traces, substantially as herein described.

8. The draft-bar having horizontal slots in its ends, links pivoted to the ends of the bar so as to turn horizontally, and having a vertical pin, I, as shown, in combination with traces J, with perforated extensions K, to enter the slots in the ends of the bar and receive the pin I, substantially as herein described.

In witness whereof I have hereunto set my hand.

GEORGE G. WICKSON.

Witnesses:
C. D. COLE,
J. H. BLOOD.